United States Patent [19]

Braeger et al.

[11] Patent Number: 5,149,297
[45] Date of Patent: Sep. 22, 1992

[54] APPARATUS FOR SEVERING THE MUSCLE FLESH OF FISH

[75] Inventors: Horst H. Braeger; Hans Finke, both of Lübeck, Fed. Rep. of Germany

[73] Assignee: Nordischer Maschinenbau Rud. Baader GmbH+Co KG, Lubeck, Fed. Rep. of Germany

[21] Appl. No.: 817,652

[22] Filed: Jan. 7, 1992

[30] Foreign Application Priority Data

Jan. 31, 1991 [DE] Fed. Rep. of Germany ... 9101085[U]

[51] Int. Cl.⁵ .............................................. A22C 25/16
[52] U.S. Cl. ................................................. 452/162
[58] Field of Search ............... 452/162, 161, 165, 150, 452/156, 149

[56] References Cited

U.S. PATENT DOCUMENTS

| | | | |
|---|---|---|---|
| 2,230,281 | 2/1941 | Baader et al. | 452/162 |
| 3,964,132 | 6/1976 | Backhaus et al. | 452/162 |
| 4,112,547 | 9/1978 | Glushkov et al. | 452/162 |
| 4,236,275 | 12/1980 | Westerdahl | 452/162 |
| 4,542,559 | 9/1985 | Brower | 452/162 |
| 4,688,297 | 8/1987 | Bartels | 452/165 |
| 4,748,723 | 6/1988 | Braeger et al. | 452/162 |

Primary Examiner—Willis Little
Attorney, Agent, or Firm—Fay, Sharpe, Beall, Fagan, Minnich & McKee

[57] ABSTRACT

It is suggested to modify a fish filleting machine in order to enable the gaining of fish sides which are different from fish fillets in that the ribs remain in the muscle flesh. In order to obtain such product at extremely favourable yield a conventional filleting machine comprising belly and back filleting tools for cutting up to the vertebral column as well as a conveyor advancing the fish saddled in the belly cavity with the tail leading is provided with a severing tool in such a manner that the circular knives forming this severing tool are controlled to move apart at the arrival of the conveying saddle of the conveyor so that this saddle can pass between the circular knives. The ribs of the fish supported on the conveying saddle are severed from the vertebral column in a manner that the flanks of the conveying saddle function as cutting counter-supports.

12 Claims, 1 Drawing Sheet

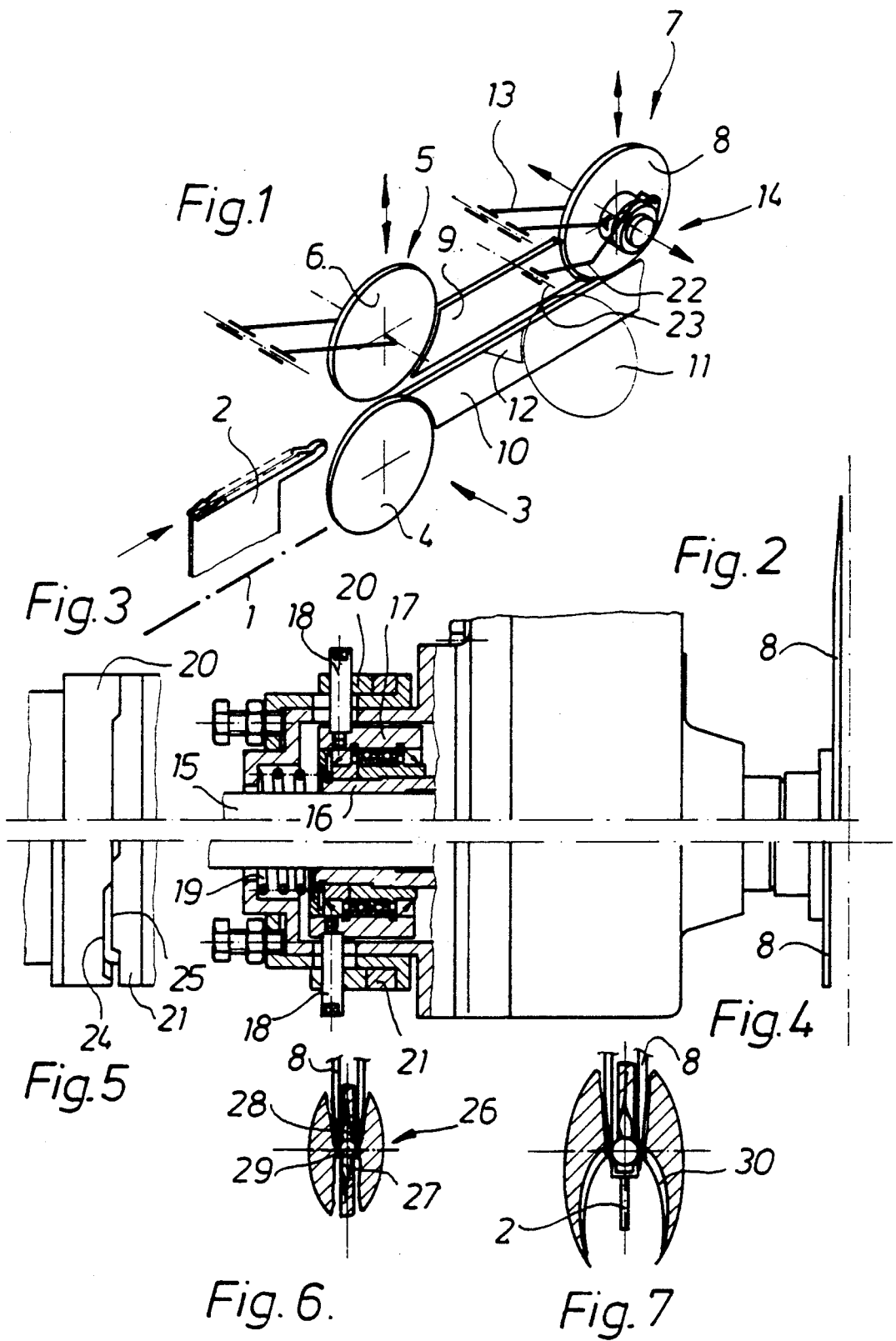

APPARATUS FOR SEVERING THE MUSCLE FLESH OF FISH

BACKGROUND OF THE INVENTION

1. Field of the Invention

The invention relates to a fish filleting apparatus, which, in general, enables the severing of muscle flesh from fish, and, in particular, to an apparatus for cutting off the muscle flesh of fish opened at their belly, which apparatus comprises a conveyor equipped with conveying saddles for receiving the fish individually engaging them within their belly cavity, and for conveying said fish with the tail leading, and further at least one belly filleting tool, one back filleting tool and one severing tool, which tools include pairs of circular knives, respectively, which are driven, arranged symmetrically with regard to the path of the conveying saddles, and designed to cut into the fish at both sides of the belly and back spokes up to the backbone, and for cutting in the region of the flanks of the backbone, respectively.

2. Prior Art

An apparatus of this type can be taken, for example, from German Patent Publication 14 54 087. With regard to the knife arrangement, this patent shows a conventional filleting machine in which the fish are mounted onto pushing saddles by means of their opened belly cavities and are conveyed with their tails leading through the working area of the filleting tools. These comprise belly and back knives, flank knives and severing knives, respectively, arranged in pairs along the path of the pushing saddles, as well as pairs of guiding plates or guiding rails in the area behind the belly and back knives. With this apparatus standard fish fillets, i.e. fillets which merely contain the pinbones present above the belly cavity region, can be obtained at high yield.

Up to the present, consumer habits have been maintained based on product forms which have originated partly from manual production and/or take into consideration needs and/or requirements, respectively, which facilitate subsequent refining steps or even make them possible Awareness of tradition and quality in respect of various of these product forms leads finally to the fact that consumers consider these to be either proof of quality, e.g. with regard to the manner of production (done by hand), or evidence of the production quality Under these circumstances, the type of mechanical production striven for today must take into consideration that the product obtained cannot be distinguished from one produced in the "traditional" manner.

Thus, in certain fields of consumption, a fish product is required which, in contrast to a fish fillet, is called a fish side. A fish side of this type is obtained, like the fish fillet, through the belly and back filleting cuts, although then the ribs encompassing the belly region are severed from the vertebral column and remain in the muscle flesh A product of this type can easily be produced by hand and has the advantage of effecting a stabilization in a smoking process. Furthermore, high yield and, in fact, a greater sales' weight are both obtainable.

Apparatuses are known for mechanized obtainment of such fish sides, but the product obtained in this manner is dissatisfactory with regard to the above-mentioned criteria.

Thus, from U.S. Pat. No. 1 682 418 an apparatus can be taken in which, beginning at the root of the tail, the fish sides are severed from the skeleton by oscillating knives whilst being conveyed by means of pairs of rollers, Which engage the bone framework progressively exposed by means of cutting/severing of the meat therefrom. During this process, the ribs are also cut off. In this process, although the spacing of the knives is controlled corresponding to the thickness of the vertebral column, it is, however, obvious that the flesh yield is not satisfactory, because the slice of fish containing the backbone together with the belly and back spokes has, respectively, the thickness of the vertebral column, which means that valuable fish flesh remains on the thinner belly and back spokes Similar conditions are also inherent in a product obtained with an apparatus shown in German published patent application 27 00 068, according to which disclosure the waste slice, having a thickness corresponding to that of the backbone and containing the backbone together with the belly and back spokes, is cut out. In this apparatus, adjustment of the spacing of the knives follows, under the influence of the change in the braking torque acting on the knives, which force is caused by the friction of the vertebrae on the knife flanks.

3. Objects of the Invention

It is therefore the primary object of the present invention to suggest an apparatus which obviates the prior art setbacks in the production of fish sides of the type described above.

It is a further and extremely important object of the present invention to specifically suggest an apparatus enabling the highest-yield obtainment of fish sides.

It is still another highly relevant and prominent object of the invention to enable the mechanical gaining of a fish side product in such a manner that the appearance thereof is comparable to that of a manually obtained product.

SUMMARY OF THE INVENTION

In an apparatus for cutting off the muscle flesh from fish opened at their bellies, which apparatus comprises a conveyor equipped with conveying saddles for receiving the fish individually by engaging them within the belly cavity, and for conveying the fish With their tail end leading, and further comprising belly and back filleting tools and a severing tool, each comprising pairs of circular knives driven in an appropriate manner and arranged symmetrically with respect to the path of the conveying saddles and arranged for cutting at both sides of the belly and back spokes up to the backbone and for cutting in the region of the flanks of the vertebral column of the fish, respectively, these objects are achieved, according to the present invention, in that the circular knives of the severing tool are arranged to be height controlled with regard to the path of the conveying saddles, and simultaneously are adjustable in their reciprocal spacing in dependence upon the height control. Advantageously, the circular knives of the severing knife can be provided with an interior chamfer along their peripheral cutting edges and may be axially and outwardly displaceable against spring force, while the flanks of the conveying saddles can function as a counter surface for the cutting action of the severing knife.

In an apparatus of this kind, it is possible that the bone structure comprising the vertebral column along with the belly and back spokes can be cut out of the fish without essential flesh remainders being left on this portion of the fish skeleton.

BRIEF DESCRIPTION OF THE DRAWING

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 shows a schematic general view of a fish filleting machine in axonomic representation;

FIG. 2 shows a longitudinal half section through the mounting position of a severing knife in its basic position;

FIG. 3 shows a partial view of the axial adjusting mechanism of the mounting according to FIG. 2;

FIG. 4 shows a longitudinal half section according to FIG. 2 with the severing knives in spread apart position; mechanism of the mounting according to FIG. 4;

FIG. 6 shows a cross section through the tail portion of the fish during action of the severing knives in this area; and FIG. 7 shows a cross section through the fish in the region of the belly cavity during the action of the severing knives in this area.

DETAILED DESCRIPTION OF THE DRAWING

The invention is used in connection with a conventional filleting machine with a knife arrangement according to FIG. 1. It comprises essentially a not-shown machine frame, in which a conveyor 1 is mounted. This conveyor is driven in a suitable way to rotate continuously in a vertical plane and is equipped with conveying saddles 2. Provided along the path defined by the movement the conveying saddles 2 and arranged to both sides of their plane of rotation are circular knives, which are respectively arranged in pairs and face each other, although mounted and driven separately. These individually constitute a fixedly mounted belly filleting tool 3 having circular knives 4, a back filleting tool 5 mounted thereabove having circular knives 6, which tool 5 in the known and, therefore, not-shown manner can be controlled by the conveyor 1 regarding its position above the path of the conveying saddles 2, and finally a severing tool having circular knives 8, which is also controllable with regard to the path of the conveying saddles 2, dependent on their conveying position and in the plane of rotation of the conveyor 1. Extending between the back filleting tool 5 and the severing tool 7, as well as behind the belly filleting tool 3 are pairs of upper and lower guides 9 and 10, respectively, which are arranged in the planes of the circular knives and thus leave a vertical gap between them, whereas a horizontal opening or gap is provided as a passage for the ribs of the fish. Usually arranged in the region of the lower guides 10 and upstream of the severing tool 7 is a rib filleting tool 11 with a controllable cutting countersupport 12, which tool, however, in the present case of application is not necessary and, therefore, merely intimated in the drawing.

The severing tool 7 is mounted on the free end of a pivot arm 13 and is provided with an adjustment mechanism 14 for the reciprocal spacing adjustment of the severing knives 8 dependent upon their position in or above the path of the conveying saddles 2, respectively. The adjustment mechanism 14 is shown in FIG. 2. In detail, the severing knife 8 is fixed in an appropriate manner on the end of a shaft 15, which is mounted inside a hollow shaft 16 in a rotary manner together with the latter. Positioned on the end of the hollow shaft 16 facing away from severing knife 8 is a bearing housing 17, which is fastened against rotation with said shaft by means of pins 18 radially arranged along its periphery, and which is axially supported by a spring 19. The pins 18 engage into a sliding ring 20, which is axially displaceable and lies frontally on an adjustment ring 21. Engaging with the periphery of the adjustment ring 21 with one of its ends is a pivotable connecting rod 22, which, with its other end, is mounted such as to pivot about a fixed axis 23. The sliding ring 20 and the adjustment ring 21 are formed on their axially directed surfaces facing each other as frontal or axial cams 24 and 25, respectively, which are complementary to each other.

The function of the apparatus according to the present invention essentially is as follows:

An advanced fish 26, saddled onto one of the conveying saddles 2 with its tail leading, is first cut into in the known manner on both sides of the belly and back spokes 27 and 28 up to the vertebral column 29 by the belly filleting tool 3 and the back filleting tool 5, respectively, and is afterwards supplied to the severing tool 7 under guidance in these incisions. As the fish 26 arrives at the severing knives 8 these are located in a lowered position with the guides 10 which are guiding the belly spokes 27 between them functioning as counter cutting support for the severing knives 8. Shortly before the arrival of the leading part of the conveying saddle 2 at the periphery of the severing knives 8, these knives are, for example, raised out of engagement with the guides 10 by means of a cam gear running synchronously with the conveyor 1 for the conveying saddles 2 and during the last part of the lifting moved apart so that the part of the conveying saddle 2 supporting the fish can run between the severing knives 8 (FIG. 7). This spacing adjustment takes place in that the pivotable connecting rod 22 as a result of the lifting movement of the pivot arm 13 carrying the severing tool 7 transfers a pivoting movement to the adjustment ring 21 with the effect that its frontal cam 25 effects an axial displacement of the sliding ring 20 and therewith the severing knives 8 against the force of spring 19 (FIGS. 2 and 4).

As the conveying saddle 2 passes by the severing tool 7, the severing knives 8 remain in an immersed position within the path of the conveying saddles 2 so that the ribs 30 (FIG. 7) or the lateral vertebral projections, respectively, which are located above the path of the saddles, are severed from the vertebral column 29. If a fish is to be processed and the diameter of the vertebrae exceeds the width of the conveying saddles 2, then the severing knives 8, as a result of their axial displaceability against the spring 19 as well as through the effect of an inner chamfer provided along their circumferential cutting edges, are displaced by the vertebrae to a distance corresponding to their diameter. This type of procedure enables the production of fish sides in a manner that is extremely favorable to high yield.

What is claimed is:

1. An apparatus for cutting off the muscle flesh from fish prepared at their bellies such as to provide an opened belly cavity, the apparatus essentially comprising
  (a) conveyor means equipped with at least one conveying element for receiving a fish individually by engaging it within said belly cavity, and for conveying said fish with its tail end leading along a conveying path defined by the movement of said at least one conveying element; and
  (b) processing tools arranged along said conveying path and including at least
    (ba) belly filleting tool means,
    (bb) back filleting tool means, and
    (bc) severing tool means,
  said tool means each comprising at least one pair of circular knives, respectively, which are driven, arranged symmetrically with regard to said path of said conveying elements, and designed to cut into said fish at both sides of belly and back spokes included in said fish up to the backbone of said fish, and for cutting in the region of the flanks defined by said backbone, respectively,
  wherein said circular knives of said severing tool means are arranged to be controlled in their position of height with regard to said conveying path and, at the same time, to be adjustable depending on said height controlling with respect to their mutual distance.

2. An apparatus as claimed in claim 1, wherein said circular knives of said severing tool means are provided with an inner chamfer along circumferential cutting edges defined by said circular knives, and arranged to be displaceable resiliently in an outward axial direction against spring force.

3. An apparatus as claimed in claim 2, wherein a spring is provided for performing said resilient displacing of said circular knives.

4. An apparatus as claimed in claim 1, wherein said at least one conveying element is provided with flanks forming cutting counter-supports for said circular knives of said severing means.

5. An apparatus as claimed in claim 2, wherein said at least one conveying element is provided with flanks forming cutting counter-supports for said circular knives of said severing means.

6. An apparatus as claimed in claim 3, wherein said at least one conveying element is provided with flanks forming cutting counter-supports for said circular knives of said severing means.

7. An apparatus as claimed in claim 1, wherein said at least one conveying element is provided as a conveying saddle.

8. An apparatus as claimed in claim 2, wherein said at least one conveying element is provided as a conveying saddle.

9. An apparatus as claimed in claim 3, wherein said at least one conveying element is provided as a conveying saddle.

10. An apparatus as claimed in claim 4, wherein said at least one conveying element is provided as a conveying saddle.

11. An apparatus as claimed in claim 5, wherein said at least one conveying element is provided as a conveying saddle.

12. An apparatus as claimed in claim 6, wherein said at least one conveying element is provided as a conveying saddle.

* * * * *